United States Patent
Herrmann et al.

(10) Patent No.: US 8,503,852 B2
(45) Date of Patent: Aug. 6, 2013

(54) SYSTEM FOR RETAINING OPTICAL DEVICES

(75) Inventors: Gregory L. Herrmann, Decatur, GA (US); David W. Kirkpatrick, Lawrenceville, GA (US); Amy Hauth, Sugar Hill, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/494,281

(22) Filed: Jun. 12, 2012

(65) Prior Publication Data

US 2012/0251065 A1   Oct. 4, 2012

Related U.S. Application Data

(62) Division of application No. 12/631,949, filed on Dec. 7, 2009, now Pat. No. 8,213,759.

(51) Int. Cl.
*G02B 6/00* (2006.01)

(52) U.S. Cl.
USPC ............ 385/135; 385/134; 385/136; 385/137

(58) Field of Classification Search
USPC .................................................. 385/134–137
See application file for complete search history.

(56) References Cited

U.S. PATENT DOCUMENTS

| 5,052,775 | A | * | 10/1991 | Bossard et al. | 385/76 |
|---|---|---|---|---|---|
| 5,701,380 | A | * | 12/1997 | Larson et al. | 385/134 |
| 5,970,193 | A | * | 10/1999 | Stratton et al. | 385/89 |
| 6,513,289 | B1 | | 2/2003 | Decore et al. | |
| 6,909,833 | B2 | * | 6/2005 | Henschel et al. | 385/135 |
| 2008/0080826 | A1 | * | 4/2008 | Leon et al. | 385/135 |
| 2008/0219632 | A1 | * | 9/2008 | Smith et al. | 385/135 |

OTHER PUBLICATIONS

Cisco, "Model GS7000 Optical Hub", Cisco Systems, Inc., Part No. 7017707 Rev A, May 2009, pp. 1-18.
Cisco, "Model GS7000 Optical Hub Installation and Operation Guide", Cisco Systems, Inc., Part No. 4030478 Rev A, 2009, 157 pages.

\* cited by examiner

*Primary Examiner* — Ryan Lepisto
*Assistant Examiner* — Guy Anderson
(74) *Attorney, Agent, or Firm* — Edell, Shapiro & Finnan, LLC (57) ABSTRACT

A system for organizing and retaining optical devices and fiber optic cable includes a housing, at least one module, and a tray coupled to the housing and including a first portion defining a receiving area and a second portion defining a track. The at least one module is releasably retained in a selected portion of the receiving area. The track extends along the receiving area and is configured for guiding cable to the retained module.

13 Claims, 14 Drawing Sheets

SYSTEM FOR RETAINING OPTICAL DEVICES

This is application is a divisional of prior application Ser. No. 12/631,949, filed Dec. 7, 2009, which is incorporated herein by reference in its entirety.

TECHNICAL FIELD

The present disclosure relates generally to an apparatus for organizing and retaining optical devices and fiber optic cable in an optical hub housing.

BACKGROUND

Network installations continue to employ increasing amounts of fiber optic cable. Fiber optic cable typically includes at least one glass core for optical, high bandwidth transmission of information. Fiber optic interconnections between active and passive modules within an optical hub housing vary depending on the desired network architecture. A conventional assembly may include various devices, each with varying physical footprints and mounting hardware, which are disposed within the hub housing along with a thick tangle of fiber optic cable. The resulting assembly is often disorganized and difficult to re-configure or troubleshoot. Moreover, the jumble of devices and cable may result in degraded performance or signal loss due to twisted or kinked cable.

DESCRIPTION OF EXAMPLE EMBODIMENTS

Overview

A fiber management system is provided for retaining a plurality of modules, such as optical passive devices, includes a housing and a tray coupled to the housing. The tray includes a first portion defining a receiving area and a second portion defining a track. One or more modules are releasably retained in selected portions of the receiving area. The track extends along the receiving area and is configured for guiding cable to and from retained modules.

Figure 1:
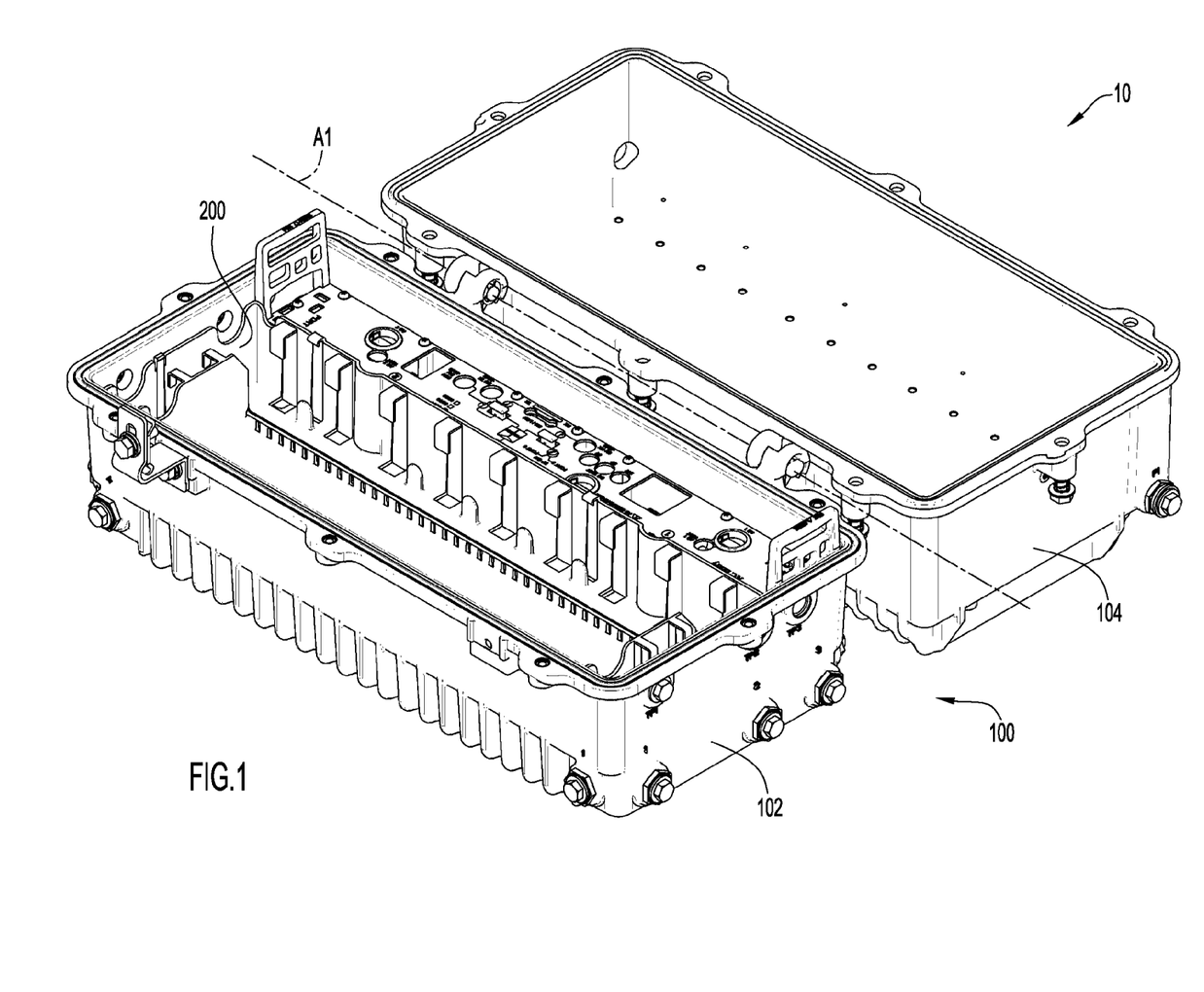
FIG. 1 illustrates a perspective view of an example of a fiber management system.

Referring to FIG. 1, an example embodiment of a fiber management system 10 includes a housing 100 and a tray 200 coupled to the housing 100. The housing 100 may include a first portion 102 hingedly connected to a second portion 104, which are pivotally moveable relative to each other about an axis A1 between an open position and a closed position. The tray 200 may be connected to an interiorly disposed surface of one of the first portion 102 or the second portion 104 of the housing 100.

Figure 2:
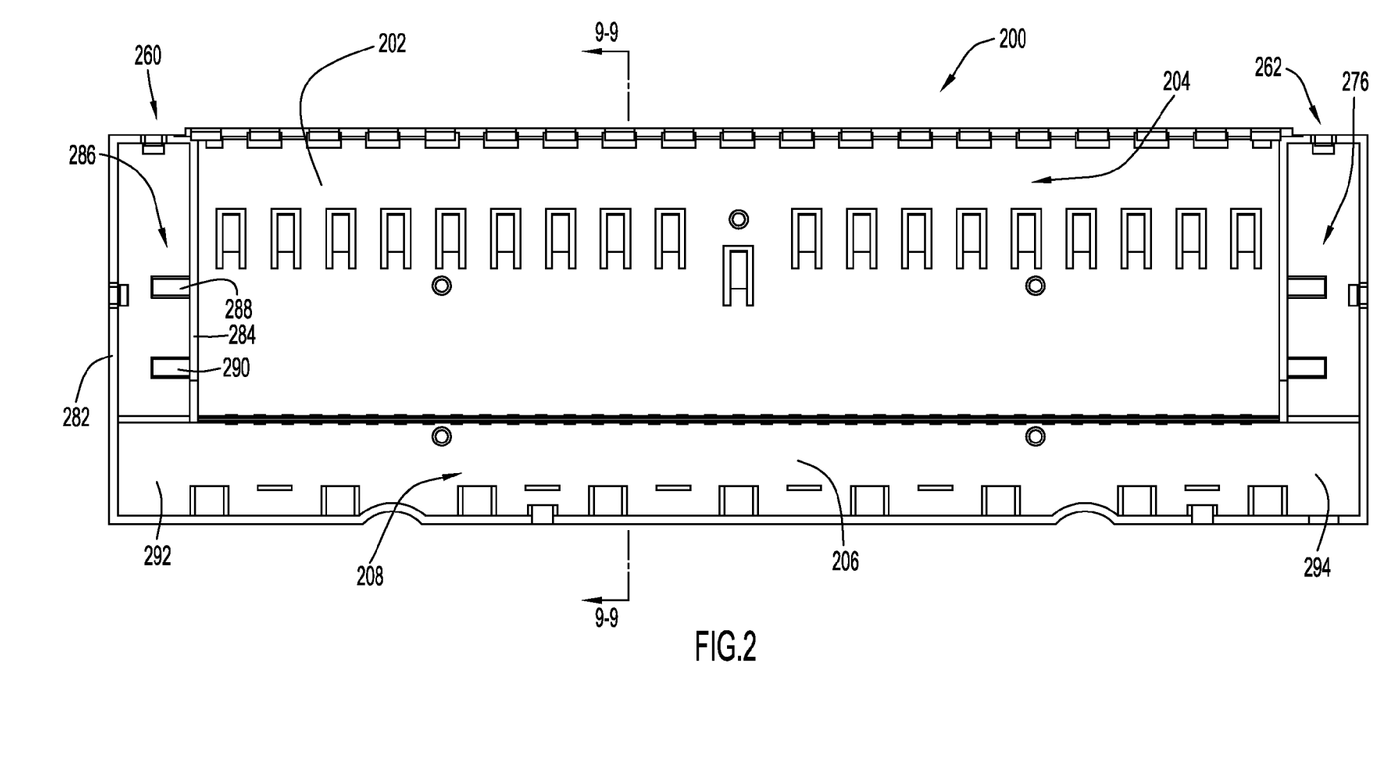
FIG. 2 illustrates a top view of a tray shown in FIG. 1.
Figure 3:
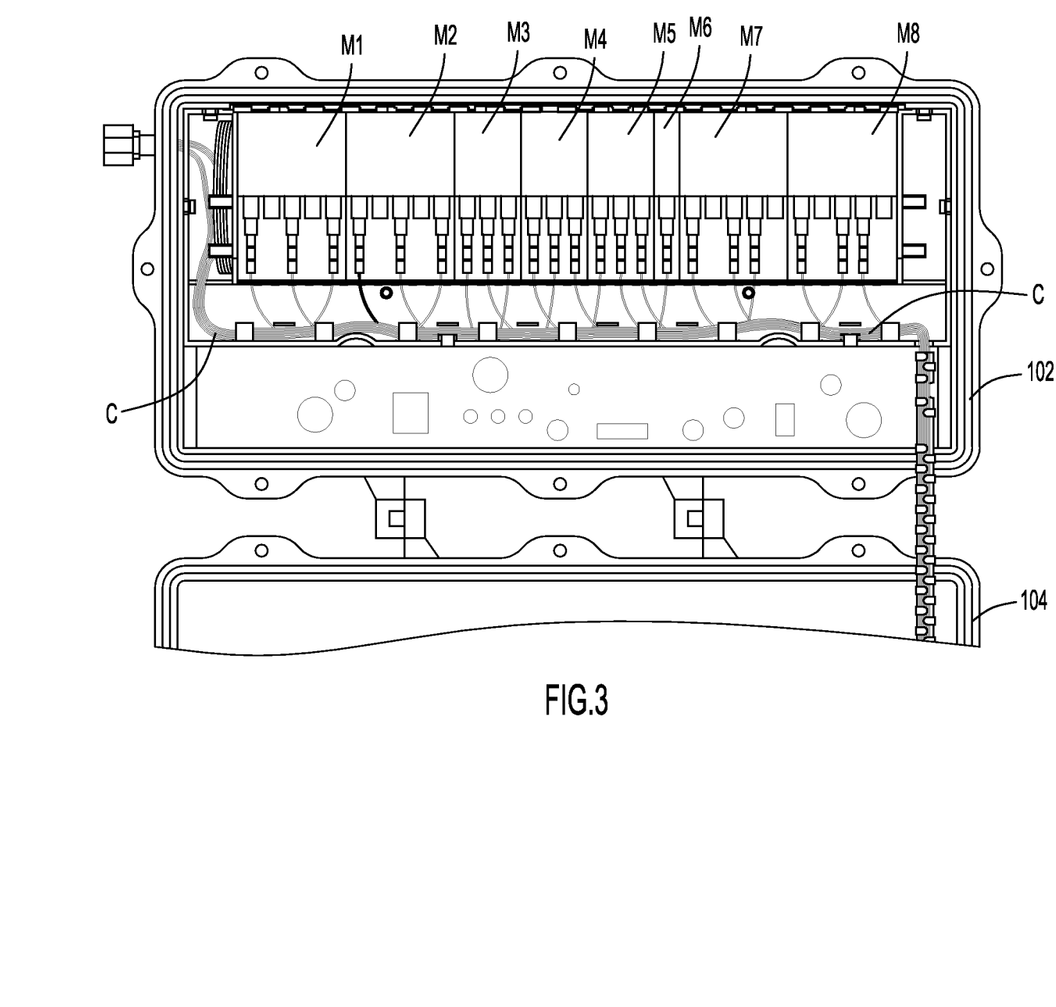
FIG. 3 illustrates a fragmentary top view of a fiber management system of FIG. 1 showing modules and cable retained within the tray.

Referring to FIG. 2, the tray 200 includes a first portion 202 defining a receiving area 204, and a second portion 206 defining a track 208. One or more modules M1, M2, M3, M4, M5, M6, M7 and/or M8, such as optical passive devices, are releasably retainable in selected portions of the receiving area 204, as shown in FIG. 3. Each of the modules are configured to process and/or manage a signal and provide a particular function (e.g. multiplexers, demultiplexers, splitters, combiners, etc.). Cable C routed to and/or from the modules M1-M8 may be guided along the track 208.

Figure 4:
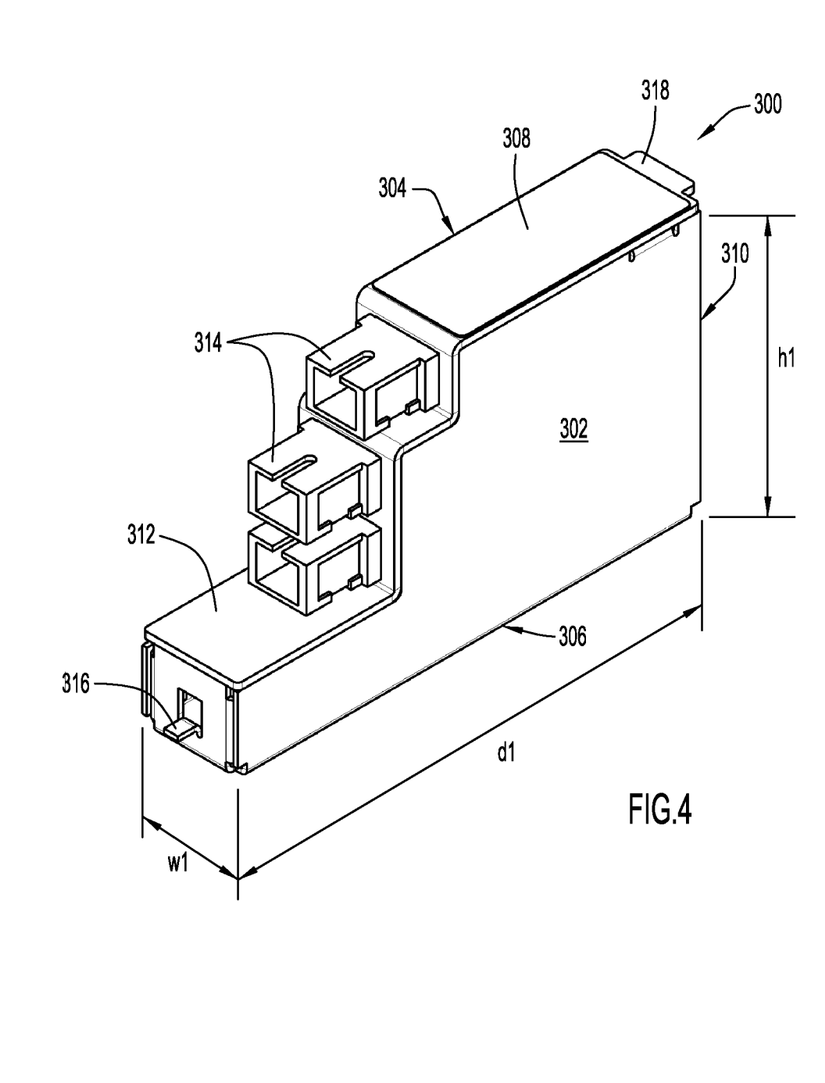
FIG. 4 illustrates a perspective view of an example embodiment of a module releasably retainable in the tray.

Referring to FIG. 4, an example embodiment of a module 300 releasably retainable in a selected portion of the receiving area 204 is illustrated. Module 300 has a generally block-like configuration including a width w1, a height h1 and a depth d1. Opposing side faces 302, 304, bottom face 306 and top face 308, and rear face 310 of module 300 may be substantially planar. Front face 312 may include a stepped surface and include openings configured for receiving adaptors 314, such as by snap or friction fit, for electrically coupling the module 300 to other components. A positioning tab 316 may extend outwardly from the front face 312, described in further detail below. A lock tab 318, also described in further detail below, may extend outwardly from the rear face 310, which is coplanar with or proximate to the top face 308.

Figure 5:
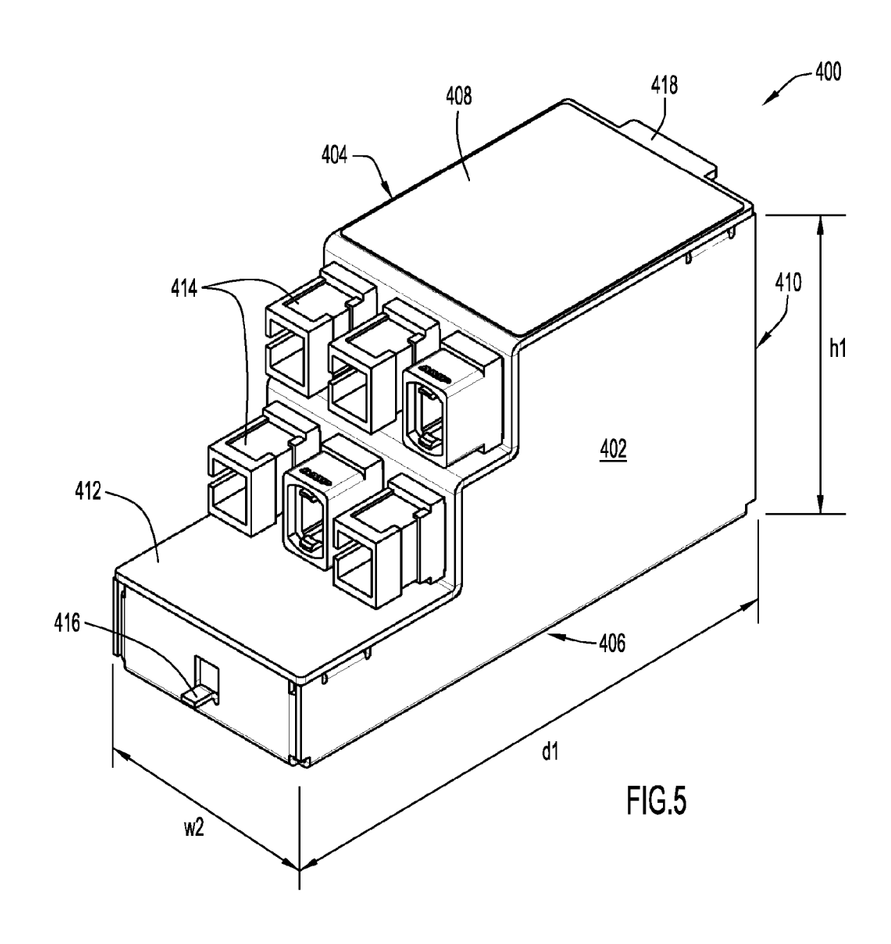
FIG. 5 illustrates a perspective view of another example embodiment of a module releasably retainable in the tray.

Referring to FIG. 5, an example embodiment of another module 400 releasably retainable in a selected portion of the receiving area 204 is illustrated. Module 400 has a width w2 that is greater than width w1 of module 300. In an example embodiment, the width w2 of module 400 is about twice the width w1 of module 300. However, the height and depth of module 400 preferably correspond to the height and depth of module 300, or height h1 and depth d1. Opposing side faces 402, 404, bottom face 406 and top face 408, and rear face 410 of module 400 are preferably substantially planar. Front face 412 may include a stepped surface and include openings configured for receiving adaptors 414 for electrically coupling the module 400 to other components. A positioning tab 416 may extend outwardly from the front face 412. A lock tab 418 may extend outwardly from the rear face 410, which is coplanar with or proximate to the top face 408.

Figure 6:
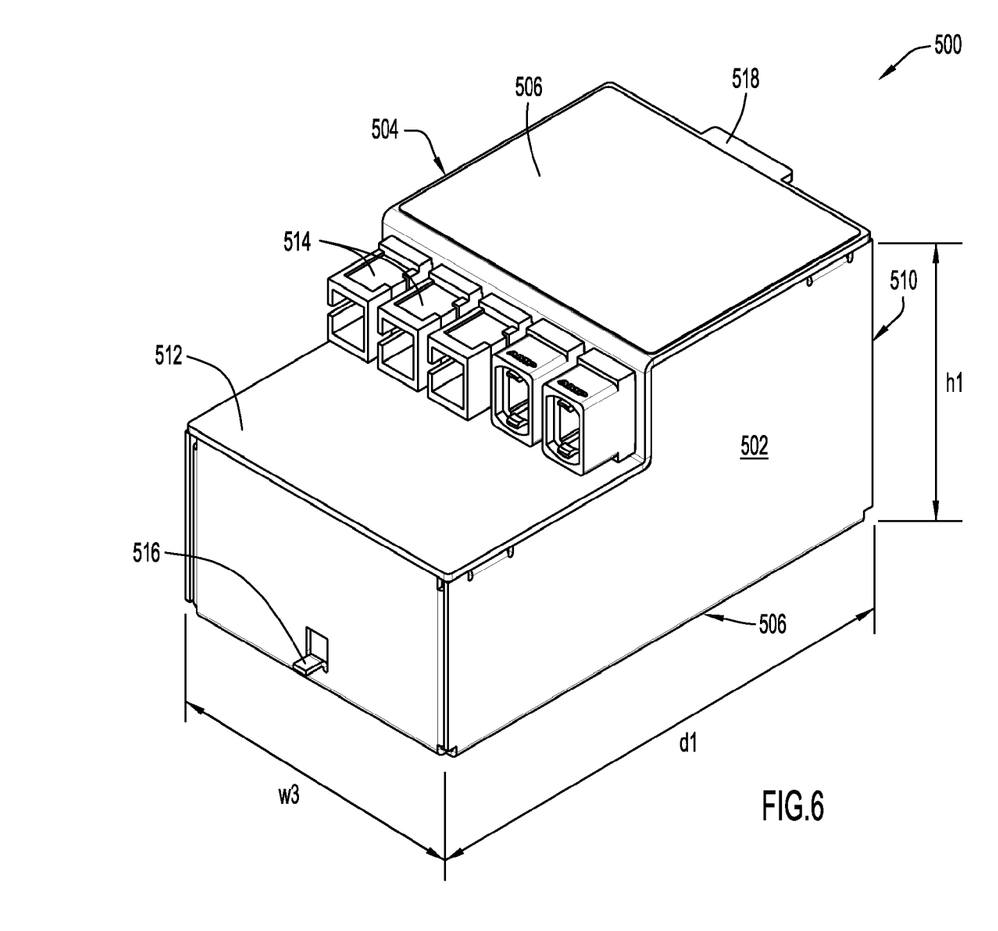
FIG. 6 illustrates a perspective view of another example embodiment of a module releasably retainable in the tray.

Referring to FIG. 6, an example embodiment of another module 500 releasably retainable in a selected portion of the receiving area 204 is illustrated. Module 500 has a width w3 that is greater than width w2 of module 400. In an example embodiment, the width w3 of module 500 is about three times the width w1 of module 300. However, the height and depth of module 500 preferably correspond to the heights and depths of modules 300 and 400, or height h1 and depth d1. Opposing side faces 502, 504, bottom face 506 and top face 508, and rear face 510 of module 500 are preferably substantially planar. A front face 512 of module 500 may include a stepped surface and include openings configured for receiving adaptors 514 for electrically coupling the module 500 to other components. A positioning tab 516 may extend outwardly from the front face 512. A lock tab 518 may extend outwardly from the rear face 510, which is coplanar with or proximate to the top face 508.

Figure 7:
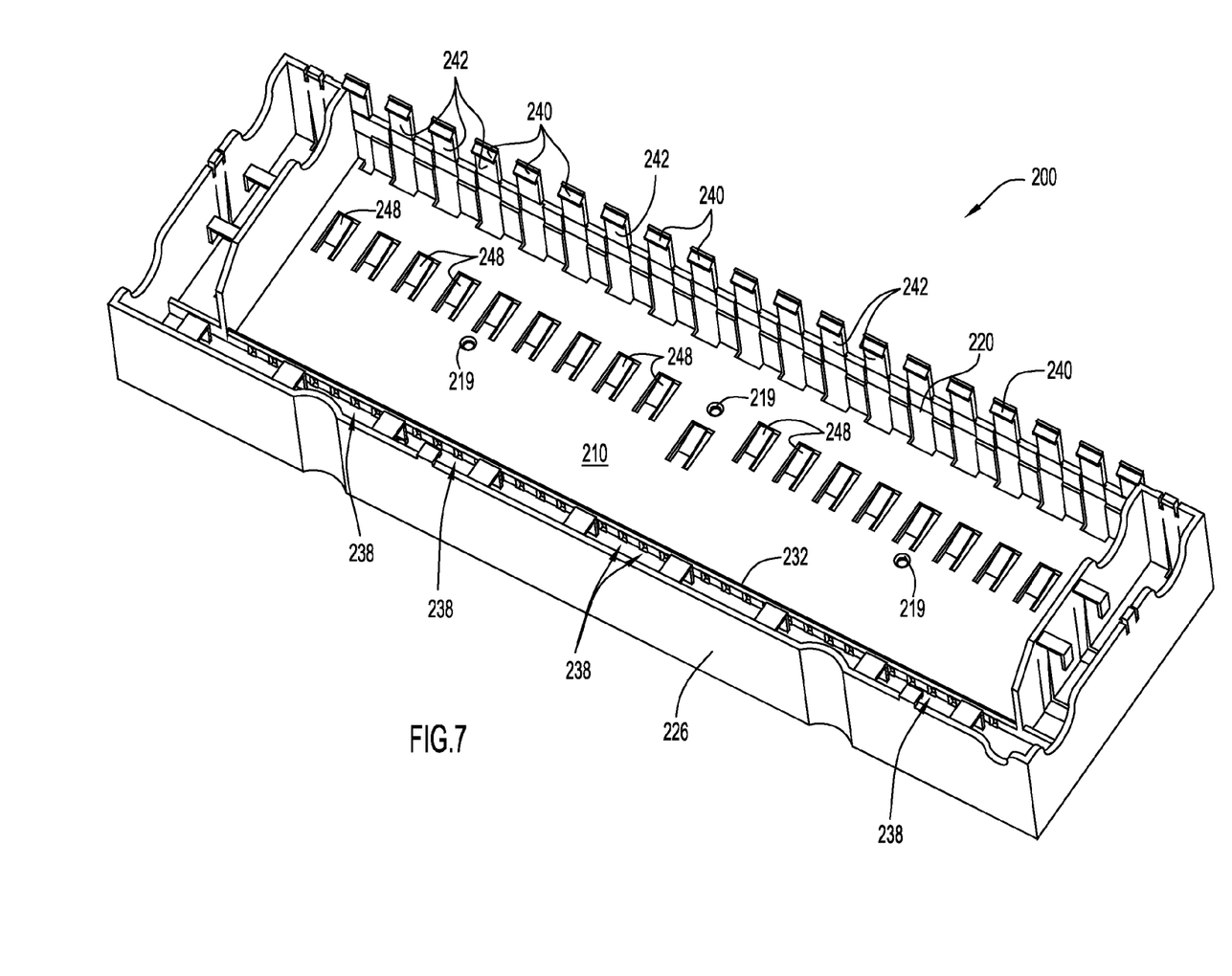
FIG. 7 illustrates a top perspective view of the tray of FIG. 2.
Figure 8:
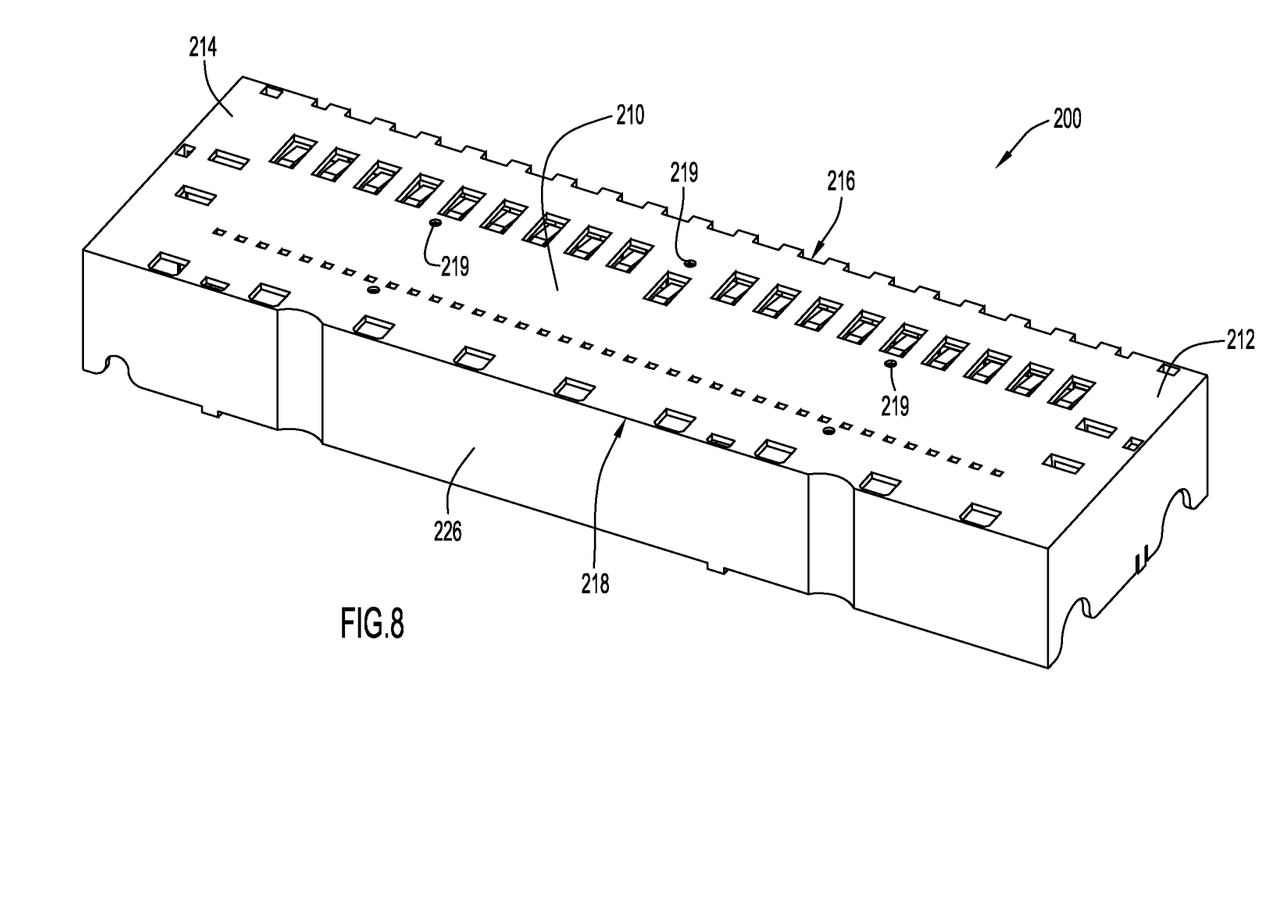
FIG. 8 illustrates a bottom perspective view of the tray of FIG. 2.
Figure 9:
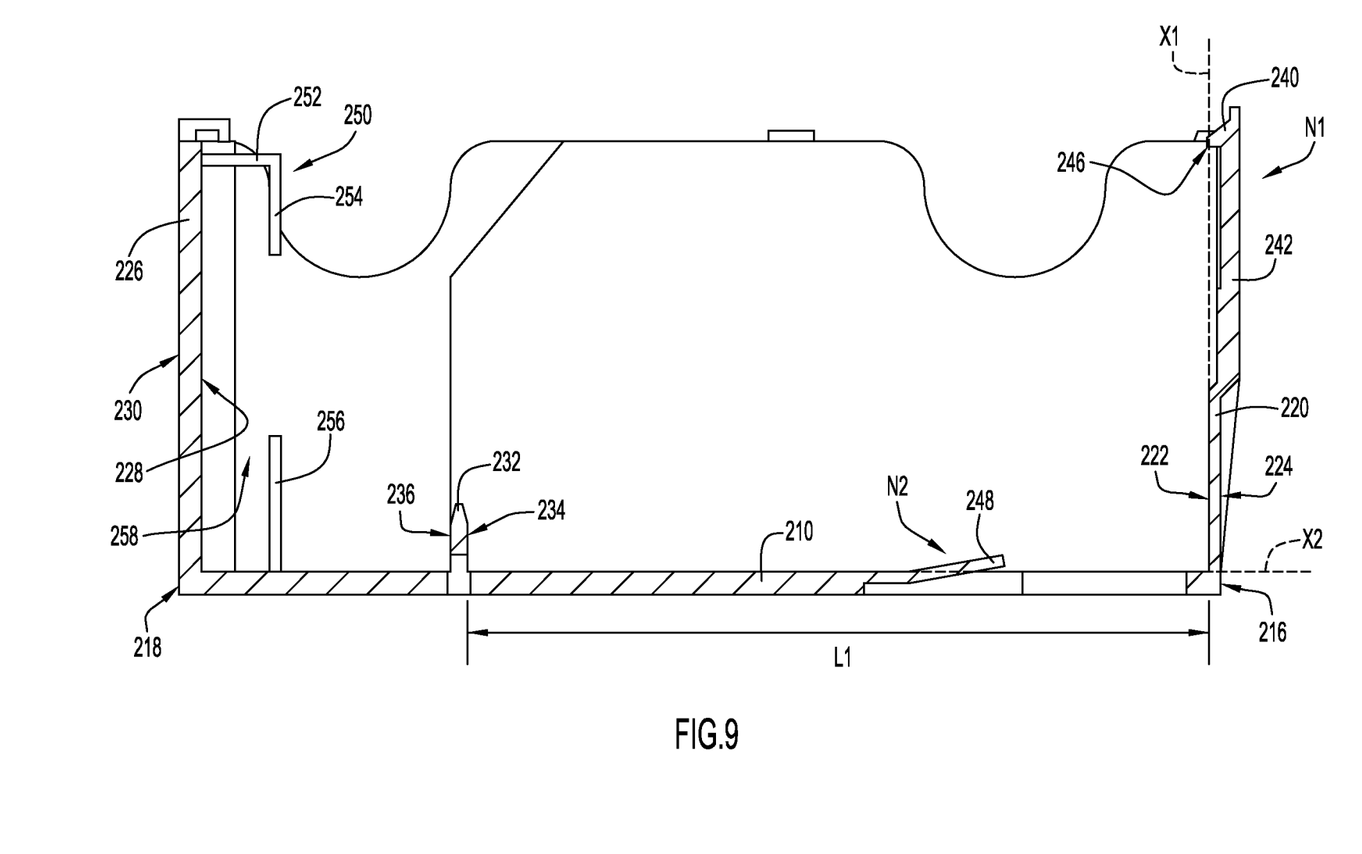
FIG. 9 illustrates a cross-sectional side view of the tray of FIG. 2 taken along line 9-9 and viewed in the direction of the arrows.

Referring to FIGS. 7, 8 and 9, an example embodiment of the tray 200 includes a base 210 having a first end portion 212 and an opposite second end portion 214, and a first side edge 216 and an opposite second side edge 218. One or more openings 219 may be provided in the base 210 through which fasteners (e.g. screws, pins, bolts, etc.) may be received for securing the tray 200 to the interiorly disposed surface of the housing 100.

A first sidewall 220 extends upwardly from the first side edge 216 of the base 210, and includes opposing faces 222, 224. A second sidewall 226 extends upwardly from the second side edge 218 of the base 210, and includes opposing faces 228, 230. A central wall 232 extends upwardly from the base 210 and between the first sidewall 220 and the second sidewall 226, and includes opposing faces 234, 236. The central wall 232 may include a plurality of spaced openings 238 extending between opposing faces 234, 236. Further, the central wall 232 may be substantially parallel to the first sidewall 220 and/or substantially parallel to the second sidewall 226.

One or more modules (e.g. modules M1-M8 and/or modules 300, 400 and/or 500) are retainable between the central wall 232 and the first sidewall 220, as shown in FIG. 3. The modules are retained within selected portions of the receiving area 204, and are linearly arranged between the first end portion 212 and the second end portion 214 of the base 210.

Figure 10:
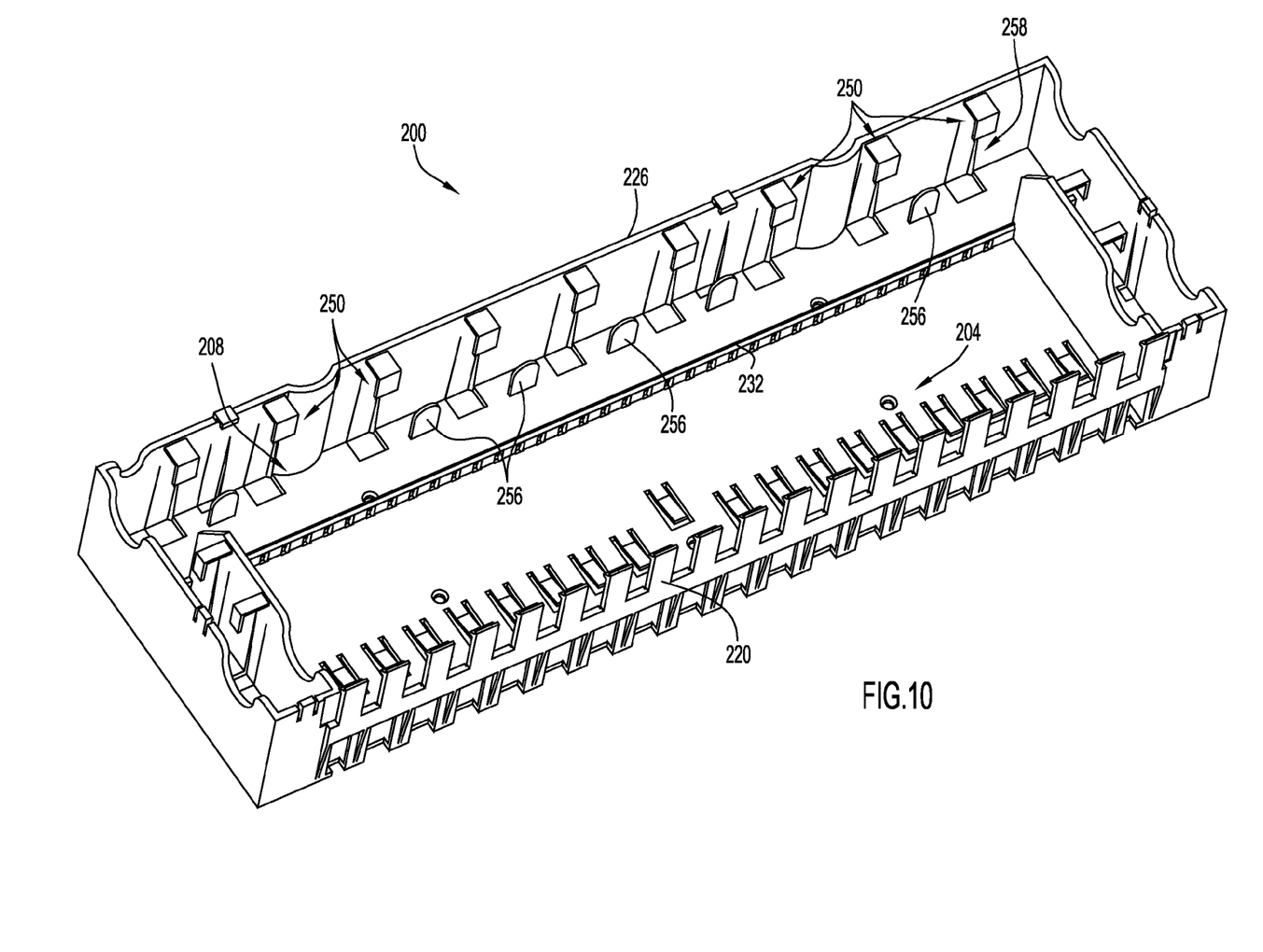
FIG. 10 illustrates another top perspective view of the tray of FIG. 2.

Referring to FIGS. 9 and 10, the track 208 is disposed between and partially defined by the second sidewall 226 and the central wall 232. The track 208 extends along the receiving area 204 and is configured for guiding cable C to and/or from the modules retained within selected portions of the receiving area 204, as shown in FIG. 3.

Figure 11:
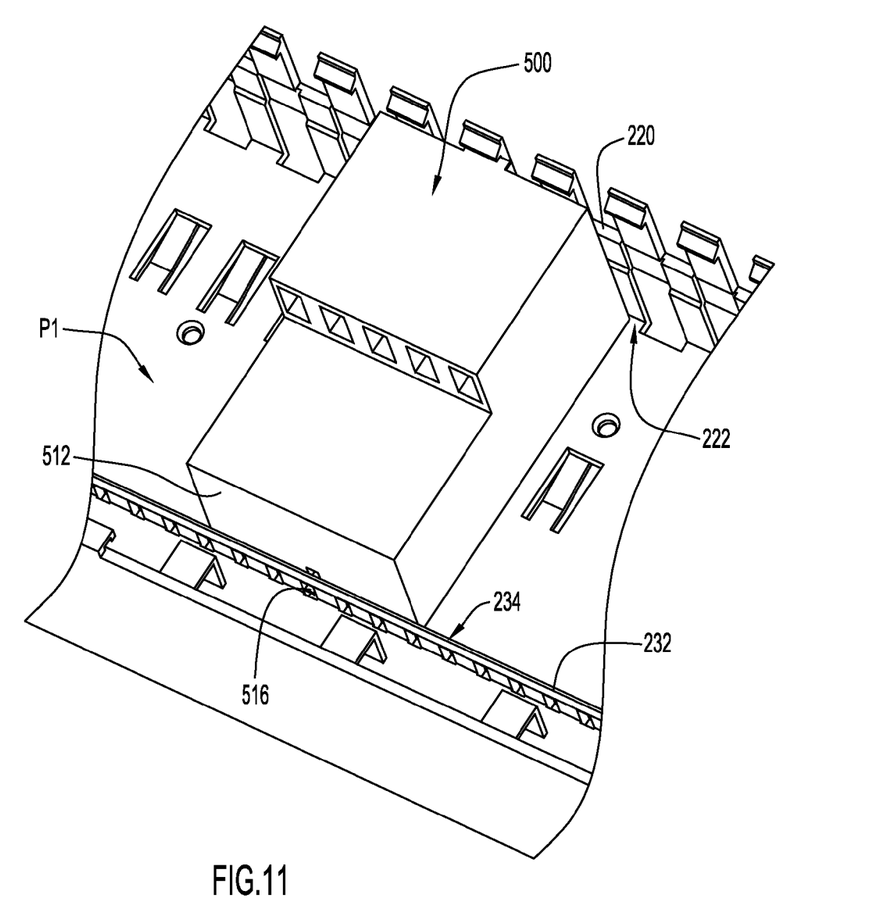
FIG. 11 illustrates a fragmentary perspective view of the tray of FIG. 2 showing a module releasably retained therein.

Referring to FIGS. 9 and 11, module 500 may be seated within a selected portion P1 of the receiving area 204 by aligning its front face 512 with the central wall 232, so that the positioning tab 516 extends through a selected one of the openings 238 and the front face 512 abuts the face 234 of the central wall 232. The distance L1 between the front face 234 of the central wall 232 and face 222 of the first sidewall 220 is substantially equal to the depth d1 of the module 500 (or 300 or 400). Accordingly, the rear face 510 of the module abuts face 222 of the first sidewall 220 when the module 500 is seated in the selected portion P1 of the receiving area 204.

Module 300 and module 400 have a depth d1 that is substantially equal to the distance L1 between the front face 234 of the central wall 232 and the face 222 of the first sidewall 220. Thus, modules 300 and/or 400 may be similarly seated within a selected portion of the receiving area 204 by aligning front face 312 and/or 412 with the central wall 232, so that the associated positioning tab 316 and/or 416 extends through a selected one of the openings 238. When seated, front face 312 and/or 412 abuts the face 234 of the central wall 232, and the rear face 310 and/or 410 abuts face 222 of the first sidewall 220.

The tray 200 may include a securing mechanism for releasably retaining the modules (e.g. modules M1-M8 and/or modules 300, 400 and/or 500) in selected portions of the receiving area 204. Referring again to FIG. 7, a plurality of clips 240 extend outwardly from face 222 of the first sidewall 220 and toward the receiving area 204. The clips 240 may be connected to support arms 242, which are defined by or extend from the first sidewall 220.

Figure 12:
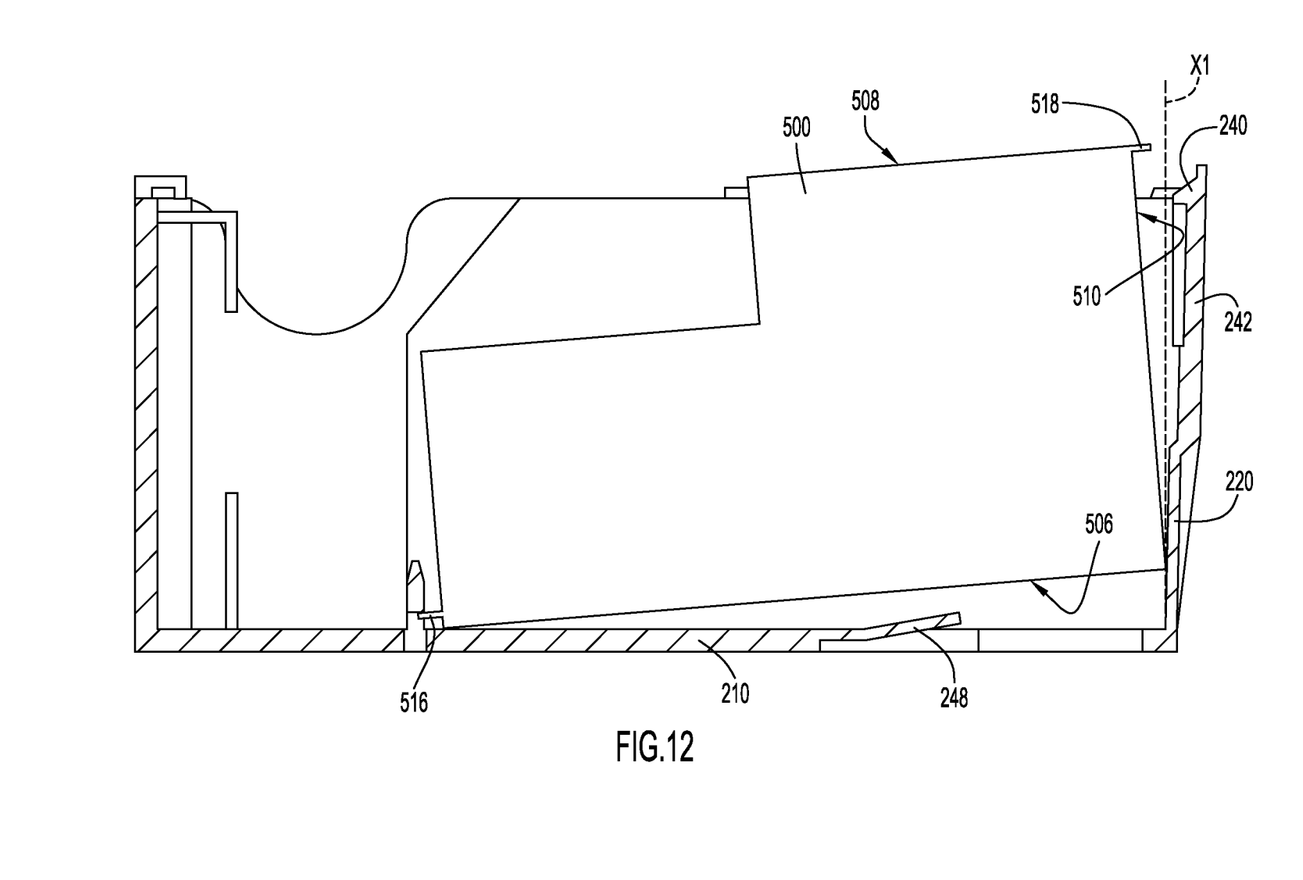
FIG. 12 illustrates a cross-sectional side view of the tray of FIG. 2 taken along line 9-9 and viewed in the direction of the arrows, and showing a module partially seated therein.
Figure 13:
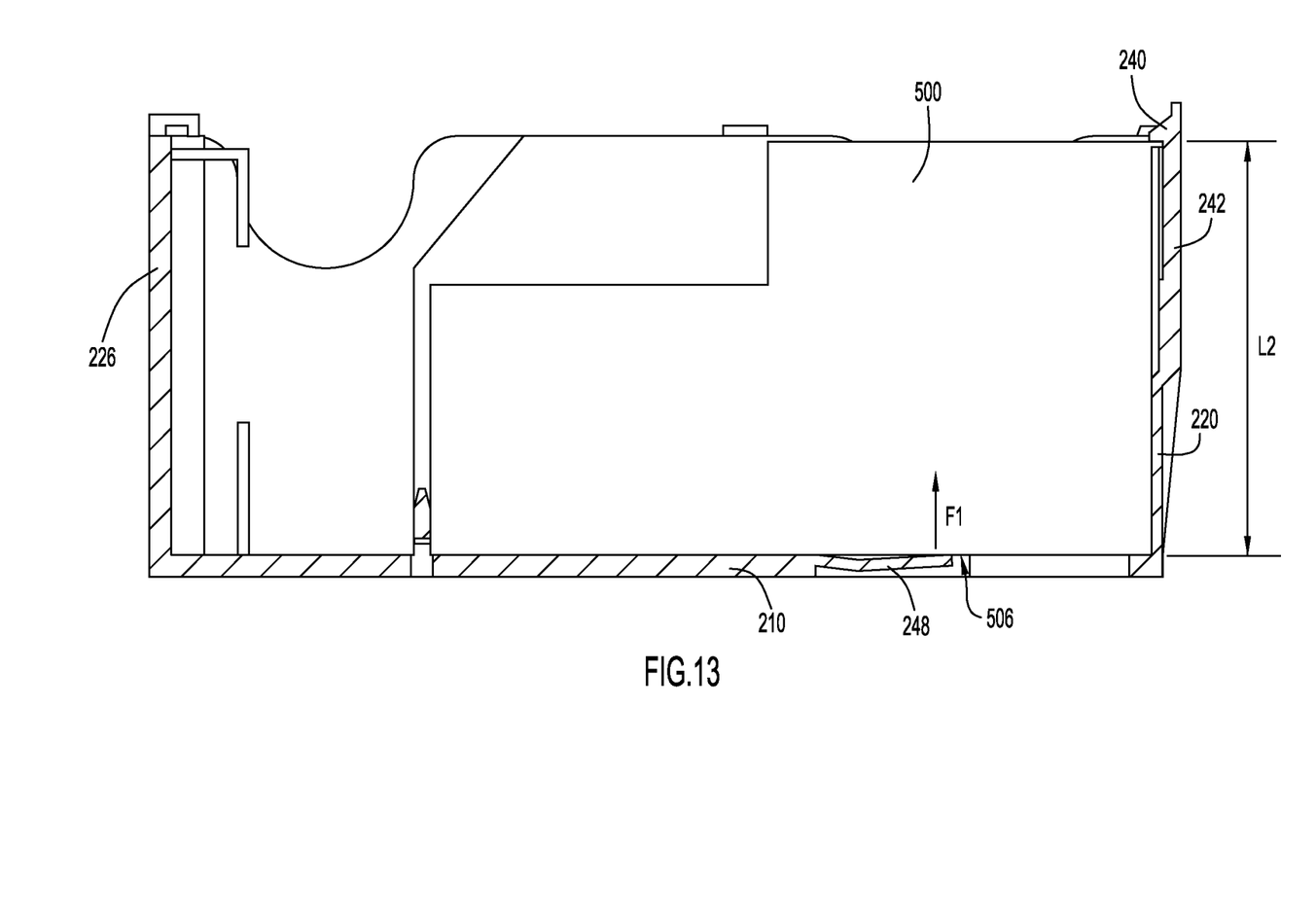
FIG. 13 illustrates a cross-sectional side view of the tray of FIG. 2 taken along line 9-9 and viewed in the direction of the arrows, and showing a module fully seated therein.

Referring to FIGS. 9, 12 and 13, the first sidewall 220 and/or the support arms 242 are biased toward a neutral position N1 along plane X1 (shown in FIG. 9), but are sufficiently flexible so that the clips 240 may be tensionably deflected outwardly from plane X1 and away from the receiving area 204 (shown in FIG. 12) to allow a module 500 (or 300 or 400) to be seated within a selected portion of the receiving area 204, as shown in FIG. 13.

The distance L2 between the base 210 and an engagement surface 246 (shown in FIG. 13) of the clips 240 is substantially equal to the height h1 of the module 500 (or 300 or 400). Accordingly, once the bottom face 506 of the module 500 is fully seated against the first portion 202 of the base 210, as shown in FIG. 13, the first sidewall 220 and/or the support arms 242 are biased inwardly back toward their neutral position N1 along plane X1. As a result, the engagement surface 246 of at least one associated clip 240 engages the lock tab 518 proximate the top face 508 of the corresponding module 500. The first sidewall 220 and/or the support arms 242 are tensionably biased toward the neutral position N1 and against the rear face 510 of the module 500, and the clips 240 are tensionably biased against the lock tab 518 and/or or top face 508 of the module 500.

It should be understood that the modules 300, 400 and/or 500 need not include their associated lock tabs 318, 418 and/or 518. Rather, the clips 240 may be configured to engage other portions of the modules 300, 400 or 500, such as the top face 308, 408 or 508, respectively.

Referring again to FIGS. 7 and 9, the tray 200 may further include a plurality of resilient tongue members 248 extending upwardly from the base 210 and into the receiving area 204. Each of the tongue members 248 is biased toward a neutral position N2 disposed outwardly from a plane X2 of the base 210. Tongue members 248 are sufficiently flexible so that they may be tensionably deflected downwardly toward the plane X2 of the base 210 to allow the bottom face 506 of the module 500 to be seated against the base 210 and within the selected portion of the receiving area, as shown in the FIG. 13. When the module 500 is properly seated within the receiving area 204, one or more tongue members 248 are tensionably biased against the bottom face 506, exerting an upward force F1 against the module 500. In turn, the module 500 is biased against the engagement surface(s) 246 of one or more clips 240. Thus, the module 500 is securely maintained within the selected portion (e.g. portion P1) of the receiving area 204.

In order to release module 500 from the selected portion of the receiving area 204, the first sidewall 220 and/or the support arms 242 are deflected outwardly from the plane X1 and away from the receiving area 204. The engagement surface(s) 246 of the associated clip(s) 240 engaging the module 500 thereby slides away from and off the lock tab 518 (or top face 508) of the module 500. The tongue member(s) 248 is then biased back to its neutral position N2, which lifts at least a portion of the top face 508 and the rear face 510 of the module 500 upwardly and above the clips 240 due to upward force F1. The first sidewall 220 and/or the support arms 242, in turn, then return to their neutral position N1 along plane X1. The module 500 is sufficiently dislodged from its seated and secured position within the receiving area 204, and may then be easily removed from the selected portion of the receiving area 204, such as for servicing and/or reconfiguration of system 10.

Similarly, modules 300 and/or 400 (or other modules such as modules M1-M8) may be releasably retained within selected portions of the receiving area 204 as described above. Because modules 300 and 400 include a depth d1 substantially the same as the depth of module 500, they are received between and engage the front face 234 of the central wall 232 and face 222 of the first sidewall 220. Further, because modules 300 and 400 include a height h1 substantially the same as the height of module 500, the first sidewall 220 and/or the support arms 242 are tensionably biased toward the neutral position N1 and against the rear faces 310, 410, and the clips 240 are tensionably biased against the lock tabs 318, 418 and/or top faces 308, 408 of the modules 300, 400, respectively.

As noted above, modules 300, 400, 500 include differing widths w1, w2, w3. In one example embodiment, the lock tabs 318, 418, 518 of the associated modules 300, 400, 500 are configured to each engage one or two clips 240, depending on the position of the module 300, 400 or 500 within the receiving area. In other embodiments, lock tabs 318, 418, 518 may have differing configurations, for example lock tab 518 may have a width greater than the width of lock tab 318. Thus, the specific number of clips 240 engaging the lock tabs 318, 418 or 518, or engaging the top face 308, 408 or 508, may vary depending on the configuration of each of the modules 300, 400 or 500. Further, the number of clips 240 engaging each module 300, 400 or 500 may vary depending on the specific configuration and spacing of clips 240 along the first sidewall 200.

Alternatively or in addition, the number of tongue members 248 engaging the bottom face 306, 406 or 506 of each corresponding module 300, 400 or 500 may vary depending on the specific configuration and spacing of the tongue members 248 along the receiving area 204.

In addition to clips 240 and/or tongue members 248, other securing mechanisms may be employed for releasably retaining modules in selected portions of the receiving area 204. For example, the first sidewall may include a relatively rigid upper lip that latches onto an upper portion (e.g. top face or lock tab) of the module, which cooperates with a deflectably resilient central wall. Alternatively, hook and loop fastener material may be provided within the receiving area, which operates with associated hook and loop fastener material disposed on the module for releasably securing the module therein. Thus, various other securing mechanism may be employed for retaining modules in the receiving area 204.

Further, modules having a width differing from the widths of modules 300, 400 or 500 (e.g. a module having a width greater than width w3) may be releasably retained within a selected portion of the receiving area 204. The example embodiments of modules 300, 400, 500 are for purposes of explanation only. The specific dimensions of the footprint of a particular module retainable within the receiving area 204 are thus variable, and dictated in part by the functionality of the module (e.g. multiplexers, demultiplexers, splitters, combiners, etc.).

In addition, although the example embodiment of the tray 200 is illustrated as being generally rectangular, other configurations may be employed. The configuration and dimensions of the housing or support to which the tray is to be attached, the functionality and configuration of the modules to be used, and the interconnections required for a particular assembly may be considered in selecting an optimal tray configuration.

For example, a tray having a generally circular or semi-circular footprint may be provided, with generally triangular or 'pie shaped' modules releasably retainable thereon. The associated track for such a circular or semi-circular tray may extend proximate to the circumference of the tray and/or in a center portion of such a tray. Alternatively, a tray having another geometric configuration may be employed (e.g. triangular, oval, square, etc.). The configuration of the associated sidewalls and securing mechanisms of the tray, if present, may vary depending on the configuration of the base of the tray employed. The configurations of associated modules releasably retained in the particular tray may therefore be partially determined by the configuration of the tray, as well as the configuration of the securing mechanism.

The system 10 may include a plurality of modules having differing dimensions, such as modules 300, 400 and/or 500, which are each releasably retainable in a selected portion and arrangement within the receiving area 204. The receiving area 204 is thus configured to retain modules of different dimensions at any given portion of the receiving area 204. However, the depths d1 and heights h1 of the modules releasably retained within the tray 200 are preferably substantially uniform (e.g. depth d1 and height h1) so that the modules may be properly seated within selected portions of the receiving area 204, and releasably retained within any selected portion along the receiving area 204.

Referring again to FIGS. 9 and 10, the second sidewall 226 may include a plurality of guide arms 250 extending outwardly from face 228 and toward the central wall 232. Each guide arm 250 may have a generally L-shaped configuration, including a first portion 252 connected to and substantially perpendicular to face 228 of the second sidewall 226 and a second portion 254 connected to a distal end of the first portion 252 and substantially parallel to face 228. A plurality of guide walls 256 may extend upwardly from the second portion 206 of the base 210 intermediate the second sidewall 226 and the central wall 232. Together, the guide arms 250, the second sidewall 226, and the guide walls 256 define a channel 258 extending proximate and along the receiving area 204 through which cable C may be routed (e.g. cable to and from the modules 300, 400, 500), as shown in FIG. 3.

Referring again to FIG. 2, the tray 200 may include a cable storage device 260 proximate to the first end portion 212 of the base 210 and configured for retaining excess cable C, such as excess cable C being routed to and/or from modules retained in the receiving area 204. Another cable storage device 262 may be disposed proximate to the second end portion 214 of the base 210 and configured for retaining excess cable C. Cable storage devices 260, 262 may have substantially identical or minor configurations. Alternatively, cable storage device 260 may have a first configuration and cable storage device 262 may have a second configuration different than the first configuration.

Figure 14:
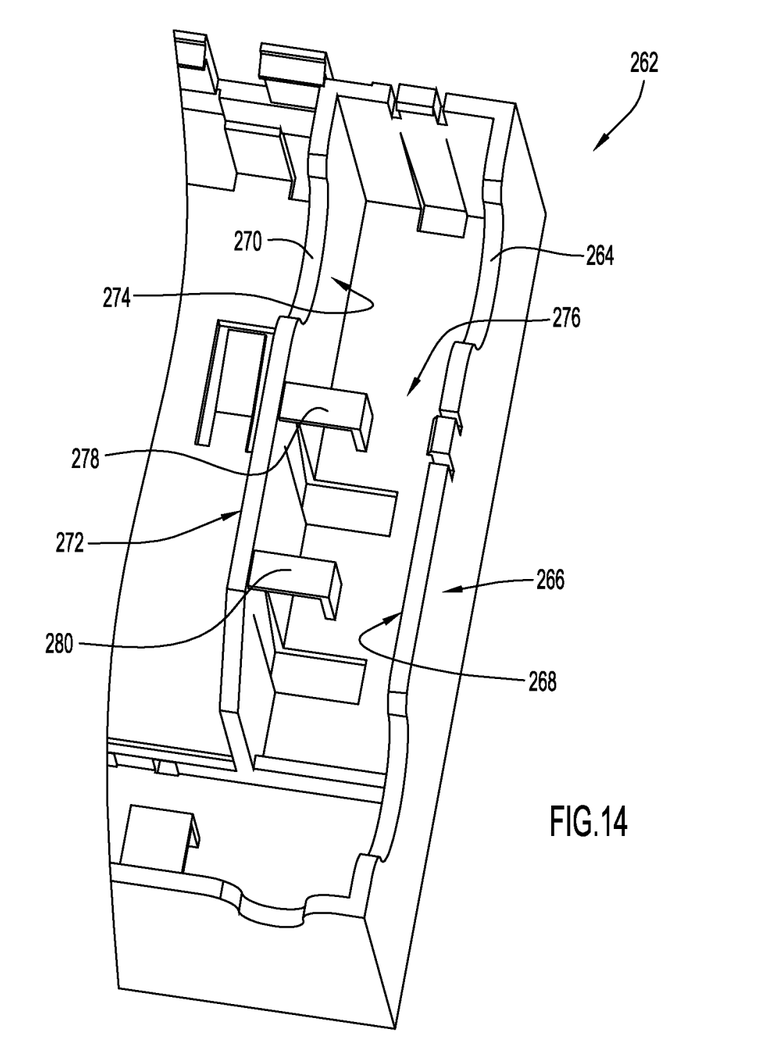
FIG. 14 illustrates a fragmentary perspective view of the tray of FIG. 2 showing a cable storage device portion of the tray.

Referring to FIG. 14, cable storage device 262 includes a first plate 264 having opposing faces 266, 268, and a second plate 270 having opposing faces 272, 274. The first plate 264 is spaced from the second plate 270 to define a slot 276 configured for storing cable, such as a coil of cable C as shown in FIG. 3. Guide arms 278, 280 extend outwardly from face 274 of the second plate 270 (and/or from face 268 of the first plate 264) and into the slot 276. Each of the guide arms 278, 280 may have a generally L-shaped configuration and help to retain the stored coil of cable C within the slot 276.

The other cable storage device 260 may have a similar configuration, as noted above and as shown in FIG. 2. Accordingly, cable storage device 260 includes first and second plates 282, 284 defining a slot 286, and guide arms 288, 290 extending outwardly from the second plate 284 and into the slot 286. One end 292 of the track 208 is in communication with slot 286 of the first cable storage device 260, and the other end 294 of the track 208 is in communication with slot 276 of the second cable storage device 262. Thus, cable C may be routed through the channel 258 and into slot 276 and/or slot 286, such a coil of excess cable C.

The fiber management system 10 streamlines the organization, removal, insertion and/or reconfiguration of modules, in particular passive optical devices, and their associated fiber optic cable within an optical hub housing. Modules having varying widths and providing various functionalities (e.g. multiplexers, demultiplexers, splitters, combiners, etc.) may be easily snapped in and out of selected portions of the receiving area 204 of the tray 200. No tools are required for installing and/or removing the modules from the tray 200. Moreover, the modules may be retained within any selected portion of the receiving area 204. Cable may be easily routed to the retained modules through the channel 258 of track 208. Excess cable is organized and stored within the integral cable storage devices 260 and/or 262, thereby maintaining an organized and easily accessible row of optical devices within the hub assembly. The organized arrangement and retention of devices and cables also minimizes the possibility of kinking or otherwise damaging the optical fiber (which is more likely if the cable is disorganized and/or jumbled within the housing).

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Further, it is to be understood that terms such as "left", "right", "front", "rear", "side", "end", "width", "inner", "outer" and the like as may be used herein, merely describe points or portions of reference and are not to be limited to any particular orientation or configuration. Further, terms such as "first", "second", "third", etc., merely identify one of a number of portions or components as disclosed herein, and do not limit the apparatus, method and system disclosed herein to any particular configuration. Accordingly, it is appropriate that the appended claims be construed broadly and in a manner consistent with the scope of the apparatus, system, and method, as set forth in the following claims.

What is claimed is:

1. An apparatus comprising:
    a base;
    a first sidewall extending upwardly from a first portion of the base, the first sidewall and the first portion of the base defining a receiving area configured to releasably retain a plurality of modules;
    a second sidewall extending upwardly from a second portion of the base, the second sidewall and the second portion of the base defining a track extending along the receiving area and configured for guiding at least one cable to the receiving area; and
    a central wall extending upwardly from a third portion of the base between the first sidewall and the second sidewall, the central wall including a plurality of spaced openings configured to receive a positioning tab of a respective module, the spaced openings facing the first sidewall and the second sidewall.

2. The apparatus of claim 1, wherein the receiving area is configured to retain modules of different dimensions at any given portion of the receiving area.

3. The apparatus of claim 1, wherein the central wall is disposed between the receiving area and the track and thereby configured to retain the plurality of modules between the central wall and the first sidewall.

4. The apparatus of claim 3, wherein the central wall is substantially parallel to the first sidewall.

5. The apparatus of claim 1, further comprising a first cable storage device disposed at a first end of the base, and a second cable storage device disposed at a second end of the base.

6. The apparatus of claim 1, wherein the first sidewall includes a plurality of clips extending outwardly and into the receiving area, each of the clips configured to be tensionably biased against a module that is retained within the receiving area.

7. The apparatus of claim 1, wherein the first portion of the base includes a plurality of resilient tongue members extending upwardly and into the receiving area, each of the tongue members configured to be tensionably biased against a bottom portion of a module that is retained within the receiving area.

8. The apparatus of claim 1, wherein the second sidewall includes a plurality of guide arms extending outwardly and into the track, the guide arms configured to retain the at least one cable between the second sidewall and the second portion of the base.

9. A method comprising:
    releasably securing a first module having first dimensions to a first portion of a receiving area on a tray, wherein the first module includes a positioning tab that extends in a direction away from a sidewall of the first portion of the receiving area on the tray and that is positioned inside one of a plurality of spaced openings configured to receive the positioning, wherein the plurality of spaced opening are disposed in a central wall that defines, along with the sidewall, the receiving area;
    releasably securing a second module having second dimensions to a second portion of the receiving area on the tray, wherein the second module includes a positioning tab that extends in a direction away from the sidewall of the second portion of the receiving area on the tray and that is positioned inside another one of a plurality of spaced openings configured to receive the positioning; and
    routing cable through a channel on the tray and adjacent the receiving area to or from the first and second modules.

10. The method of claim 9, further comprising:
    removing the first module from the first portion of the receiving area; and
    securing a third module having third dimensions to the first portion of the receiving area.

11. The method of claim 9, further comprising retaining modules of different dimensions at any given portion of the receiving area.

12. The method of claim 9, wherein the sidewall includes a plurality of clips extending outwardly and into the receiving area, and tensionably biasing the clips against the first and second modules that are retained within the receiving area.

13. The method of claim 9, wherein the receiving area includes a plurality of resilient tongue members extending upwardly and into the receiving area, and tensionably biasing each of the tongue members against a bottom portion of the first and second modules that are retained within the receiving area.

* * * * *